United States Patent
Samanta et al.

(10) Patent No.: US 9,015,525 B2
(45) Date of Patent: Apr. 21, 2015

(54) SMART ACTIVE-ACTIVE HIGH AVAILABILITY DAS SYSTEMS

(75) Inventors: Sumanesh Samanta, Bangalore (IN); Sujan Biswas, Bangalore (IN); Horia Simionescu, Foster City, CA (US)

(73) Assignee: LSI Corporation, San Jose, CA (US)

( * ) Notice: Subject to any disclaimer, the term of this patent is extended or adjusted under 35 U.S.C. 154(b) by 401 days.

(21) Appl. No.: 13/526,881

(22) Filed: Jun. 19, 2012

(65) Prior Publication Data

US 2013/0339786 A1    Dec. 19, 2013

(51) Int. Cl.
G06F 11/00 (2006.01)
G06F 11/16 (2006.01)
G06F 11/20 (2006.01)

(52) U.S. Cl.
CPC ........ G06F 11/1666 (2013.01); G06F 11/2089 (2013.01); G06F 11/2097 (2013.01)

(58) Field of Classification Search
CPC ............ G06F 12/0866; G06F 12/0888; G06F 11/2092; G06F 3/067
USPC .......... 714/5.11, 11, 6.21; 711/162, 111, 113, 711/116, 119
See application file for complete search history.

(56) References Cited

U.S. PATENT DOCUMENTS

| | | | |
|---|---|---|---|
| 6,321,298 B1 * | 11/2001 | Hubis ............................ 711/124 |
| 6,412,045 B1 * | 6/2002 | DeKoning et al. ............ 711/135 |
| 6,567,889 B1 * | 5/2003 | DeKoning et al. ............ 711/114 |
| 7,395,390 B2 * | 7/2008 | Chen .............................. 711/162 |
| 7,899,791 B1 * | 3/2011 | Gole .............................. 707/654 |
| 7,921,328 B1 * | 4/2011 | Gulati et al. ................. 714/6.23 |
| 2002/0133735 A1 * | 9/2002 | McKean et al. .................... 714/5 |
| 2008/0005614 A1 * | 1/2008 | Lubbers et al. ................. 714/11 |
| 2008/0016301 A1 * | 1/2008 | Chen .............................. 711/162 |
| 2009/0319724 A1 * | 12/2009 | Oe et al. ......................... 711/113 |
| 2010/0082793 A1 | 4/2010 | Woods et al. |
| 2011/0029730 A1 * | 2/2011 | Durocher et al. ............. 711/114 |
| 2011/0145307 A1 | 6/2011 | Ananthanarayanan et al. |
| 2014/0229676 A1 * | 8/2014 | Biswas et al. ................. 711/119 |

* cited by examiner

*Primary Examiner* — Bryce Bonzo
*Assistant Examiner* — Jeison C Arcos
(74) *Attorney, Agent, or Firm* — Suiter Swantz pc llo

(57) ABSTRACT

A high availability DAS system uses a solid state cache to provide near active-active performance in a DAS duster, while retaining the implementation simplicity of active-passive or dual active system. Each node in the duster may include a solid state cache that stores hot I/O in an active-active mode, which allows the data to be read from or written to the underlying dual-active or active/passive DAS RAID system only when access to the "hot Region" cools down or in the case of Cache Miss. The hot I/O data includes hot read data that accumulated dynamically regardless of ownership of the drives where the hot read data is permanently stored. The hot I/O data also includes hot write data that is mirrored across the solid state cache memories to avoid potential dirty write data conflicts and also to provide High Availability in case of server failures.

24 Claims, 7 Drawing Sheets

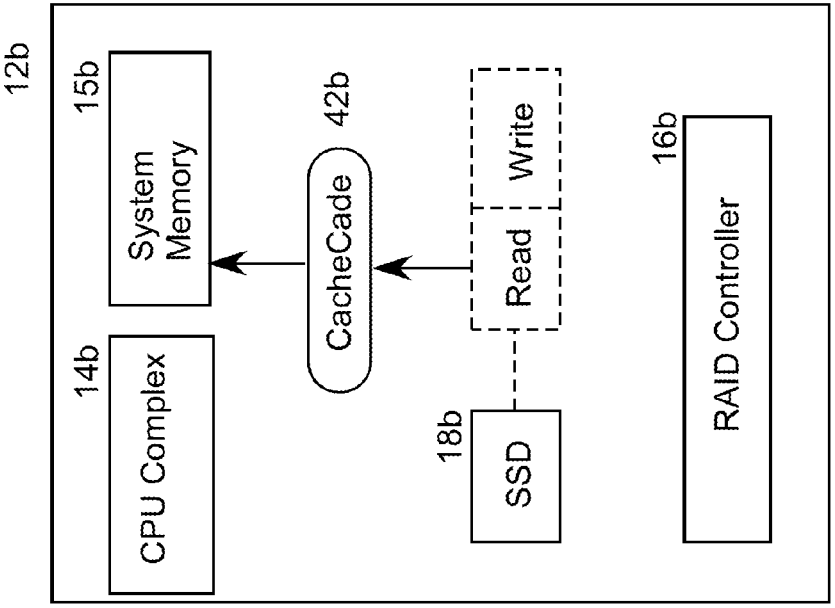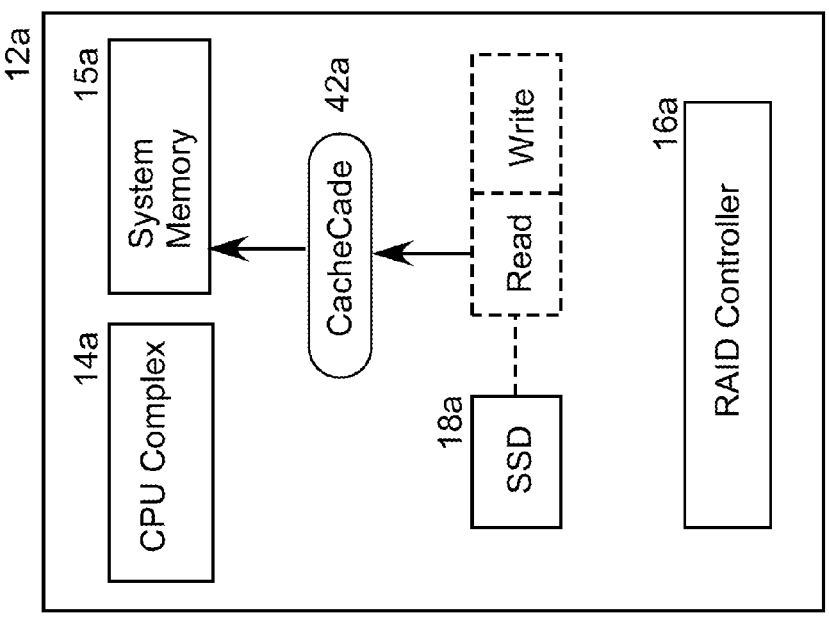
FIG. 2

SMART ACTIVE-ACTIVE HIGH AVAILABILITY DAS SYSTEMS

TECHNICAL FIELD

The present invention relates to high available cluster systems for computer networks and, more particularly, to a high availability DAS system using a solid state cache to provide near active-active performance in a dual-active or active/passive DAS RAID system.

BACKGROUND

Redundant array of independent disks (RAID) systems have been developed to provide protection against disk failure. However, Direct Attached Storage (DAS) RAID controllers are defenseless against server failure, since by definition the data storage system is embedded inside a server. If the server dies, the RAID controller dies, and the stored data is temporarily unavailable until the server and RAID controller are brought back online. To counter this problem, enterprise customers with critical data often utilize High Availability DAS clusters including two or more server nodes, each having an embedded DAS system with a RAID controller which are in turn connected to the same set of disks in an enclosure. The disks are separately powered and even if a server dies, the RAID system of the other server picks up the disks to serve IO in a non-disruptive mode.

These multi-server DAS clusters have been known to develop multi-initiator problems arising when more than one server attempt to simultaneously access data stored on the same drive. The conventional solutions to this problem include dual-active configurations in which each drive is "owned" by only one server, which provided exclusive control over access to its own drives. While this approach avoids multi-initiator conflicts, it can result in a high volume of data (IO) shipping between servers. Alternatively, the drives may be configured in an active-passive configuration in which only one server is active at a time and the second server becomes active only when the first server fails. Both approaches have drawbacks when upper layer send IO to both servers, since IOs to non-owned disks need to be shipped to the other server.

There is, therefore, a continuing need for improved high availability DAS systems. More particularly, there is a need for improved DAS clusters that overcome the shortcomings of conventional active-passive and dual-active DAS clusters.

SUMMARY

The invention provides a high availability DAS system using a solid state cache to provide smart active-active capability in a DAS cluster. Each node in the cluster may include a solid state cache that stores (caches) "hot I/O" (most frequently accessed locations of the disk) in an active-active mode, which allows the data to be read from or written to the underlying dual-active or active/passive DAS RAID system only when there is a Cache miss, i.e. the data sought is not in the SSD cache and needs to be brought from the underlying Hard drives. The hot I/O data includes hot read data that accumulates dynamically regardless of ownership of the direct attached drives where the hot read data is permanently stored. The hot I/O data also includes hot write data that is mirrored across the solid state cache memories on two servers, so that in the event of a server failure dirty data can be served from the surviving server, and also to avoid potential dirty write data conflicts. The invention may be, but need not be, implemented on a DAS cluster in a dual-active or active-passive RAID system.

More specifically, "hot read" data is stored in the solid state cache memory on each node depending solely on the origin of the READ IO and regardless of the ownership of the underlying VD. For example, suppose server A owners the VD but most IO is coming to server B. In that case, READ cache will accumulate in Server B, and NOT in server A. For a cache Hit, this cached READ data will be served directly from Server B cache, without the need of IO shipment to server A . . . . The system allows the hot read data to build up dynamically based on the usage pattern regardless of the ownership of the physical attached drives where the hot read data is permanently stored. This eliminates multiple shipping transactions for the hot read data regardless of which node owns the drives where the hot read data is permanently stored.

With respect to hot write data, the solid state memory on each node contains a mirror copy of any dirty write data. This maintains the integrity of the dirty write data across the servers until it is written to permanent storage, while allowing the each node to store the write data in its own solid state cache regardless of which server owns the physical drive where the data is permanently stored. Although the solid state cache technique could be applied to hot read data or hot write data only, the most benefit is derived from active-active caching of hot read and hot write data according to the invention.

The invention may also be practiced in a DAS system in which a single server contains multiple I/O controllers that each have a dedicated set of attached data drives. This system includes a separate cache memory dedicated to each I/O controller, which in turn mediates access to its dedicated set of data drives. The cache memories are configured to implement the smart active-active cache memory system of the present invention, in which hot read data accumulates dynamically in each cache regardless of ownership and dirty write data is mirrored across the cache memories. The single-server, multiple-controller DAS system is similar to the multiple-server DAS system except that multiple controllers implemented on a single server take the place of multiple controllers implemented on different servers. The DAS system otherwise operate in an analogous manner. In this manner, the invention may be practiced among any set of I/O controllers with dedicated drives regardless of the number of I/O controllers implemented on any particular server.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE FIGURES

The numerous advantages of the invention may be better understood with reference to the accompanying figures in which:

FIG. 2 is a data flow diagram of a read request for data stored on the owned node in the DAS cluster utilizing with active-active solid state cache system.

DETAILED DESCRIPTION OF ILLUSTRATIVE EMBODIMENTS

Figure 1:
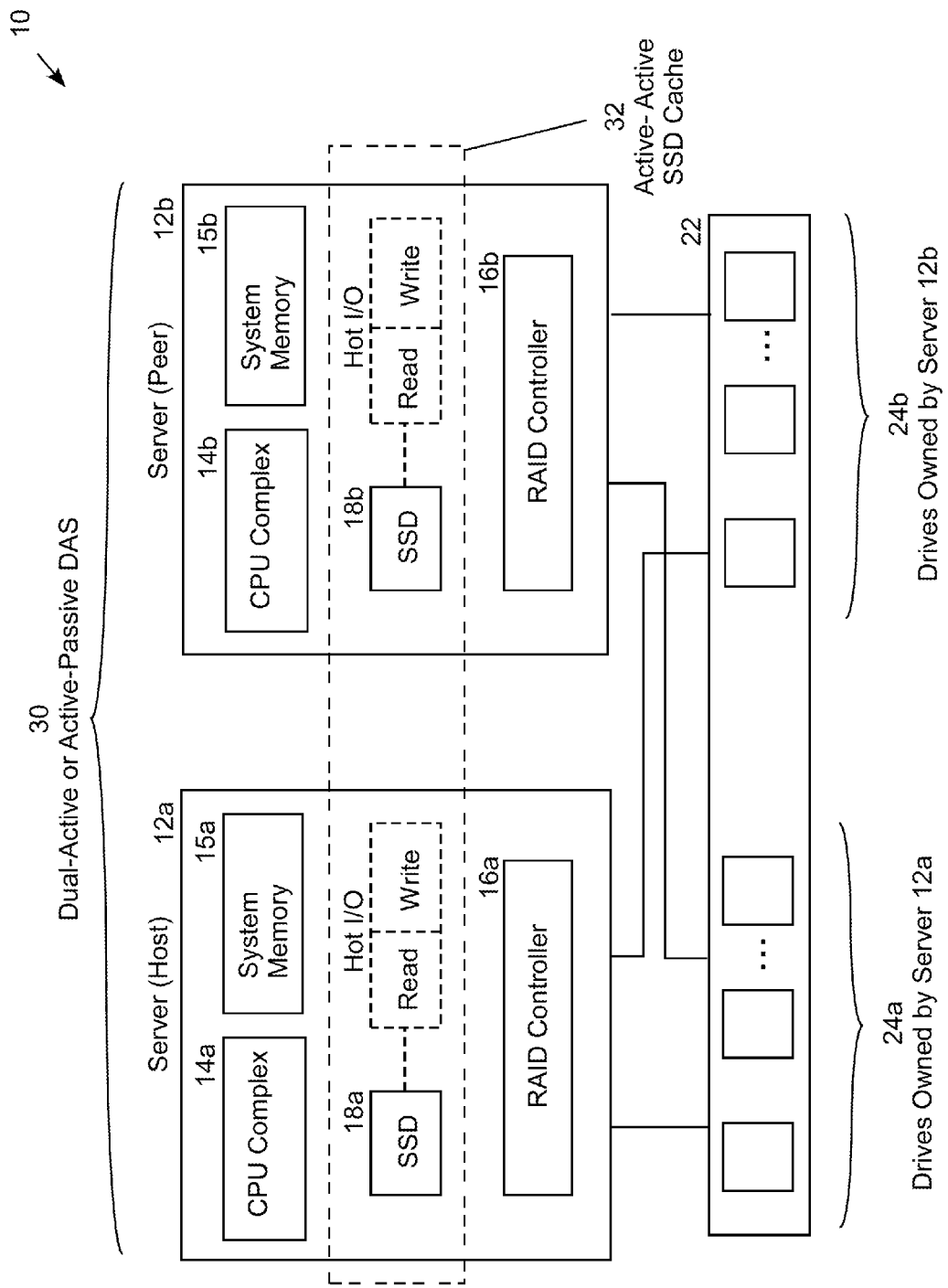
FIG. 1 is a functional block diagram of a DAS cluster with active-active solid state cache.

The invention may be embodied in a passive-active or dual-active DAS cluster with active-active solid state cache memory (SSD) located in each node of the cluster. Although a two-server DAS cluster is shown in the drawings and discussed below for descriptive convenience, it will be appreciated that the invention could be expanded to a DAS system with any number of nodes. In addition, the "host" typically refers to the server receiving an I/O request, the "owner" typically refers to the server owning the physical drive where the I/O is physically stored, and the "peer" typically refers to any other server in the cluster. Although the DAS nodes are typically referred to as the host, owner or peer nodes for a particular I/O transaction, this designation is relative and any node may be the host, owner or peer node for a particular I/O transaction depending on whether the subject node receives the I/O request or owns the physical drive where the requested I/O is permanently located. It will also be understood that the illustrated embodiments include redundant array of independent disks (RAID) systems as the example applications mediating the DAS system, but it will be understood that invention could be applied to any type of system or application that utilizes the disk memory controlled by multiple servers of the DAS cluster.

In this type of multi-server high availability DAS data storage system, the direct attached drives are typically optical storage drives (sometimes referred to as JBODS for "just basic old drives") that can be accessed by both controllers (often referred to as "CPUs," "servers," "initiators" or "nodes"). However, access conflicts known as multi-initiator issues can arise if both controllers attempt to configure, spin up, or send I/O to the same storage device simultaneously. For example, one initiator might start a task management, reset after timeout, which the other initiator does not know about. The other node might then initiate another reset, leading to a "reset storm." In addition, effective storage management requires that band with negotiation be coordinated between the controllers for a variety of background operations, such as rebuild, reconstruction, make consistent, and so forth.

While these problems could potentially be solved by coordination and communication between servers, the communication overhead quickly becomes too heavy and the code unduly complex. As a result, DAS clusters have typically opted for an active-passive or a dual-active configuration to prevent multi-initiator conflicts from arising. In the active-passive configuration, both initiators are connected to all of the drives, but only the first initiator is in an active mode, while the second initiator remains in a passive mode. The second initiator becomes active only when the first initiator is offline for some reason. As a result, only one initiator is active at a time in the active-passive configuration. While this approach prevents multi-initiator issues from arising, it also leaves the DAS controller in one of the servers inactive at any time.

Alternatively, in the dual-active configuration, both initiators are active at the same time. To avoid multi-initiator issues, each drive is exclusively controlled by (also referred to as "owned by") only one of the potential initiator nodes (e.g., servers). In this case, I/O that lands on the non-owning node has to be shipped to the owning node. While this approach is also effective in eliminating multi-initiator issues, the shipping of I/O requests between nodes degrades the system performance and can become severe in configurations that systematically use drive space owned by both controllers. For example, sever overhead data shipping can occur when there are multiple virtual drives on each physical drive and the virtual drives on a particular physical drive are assigned to different nodes. As another example, shipping requests can become severe when an upper layer in the operating system is configured to purposely send I/O in an active-active mode to intentionally spread the data among the nodes. Some RAID controllers, for example, may be configured to intentionally spread the stored data in an active-active configuration as part of the RAID data security protocol. Allowing guest access to the drives can also increase shipping because the guest operating system may not be configured to operate in consideration of the node system of the host.

The invention may be applied in any DAS cluster in which there is a local SSD cache accelerator in each server. For example, this SSD may either be a local disk visible only to one server, or an onboard SSD on the controller. Hot I/O (i.e., I/O occurring frequently in the same local block address [LBA] range) is cached in the local SSD in both the owner and peer, based on I/O pattern, irrespective of ownership.

Because ownership is not taken into consideration for caching, hot READ data builds up on the local caches dynamically based on I/O pattern only, irrespective of ownership. For cache hit (majority of I/O, since SSD cache is typically very large in size) data will be served from local controller only, again irrespective of ownership. All slow, rotating disk bound I/O will still follow the I/O shipping mechanism. The region locks will be maintained at the owner side only, and for I/O that can be completed from peer side SSD cache, will be done so, after acquiring the lock from the Owner.

All rotating disks still have a single owner controller. The hot read data is therefore maintained in both controllers regardless of ownership, while the cold data is store in the owned drive according to the underlying multi-server DAS protocol. Thus, hot read I/O is cached in the controller receiving the I/O, not depending on ownership and changing dynamically based on I/O pattern. For any I/O shipped from a peer node, the owner node will typically not run heat logic, but will be able to perform other operations, such as search in SSD, DDR, take Region lock, etc. Hot write data is mirrored in cache across the servers to avoid potential dirty write data conflicts.

The invention therefore produces a major performance improvement for a dual-active DAS system because I/O shipping is eliminated for the majority of I/O, which is accessed from the SSD cache. For a READ request received on a node for hot read data stored in the SSD of that node, the node serves the data through direct memory access without any shipping across the SAS link. For a READ request received on a host node for hot read data stored in SSD on another node (SSD owner node), the peer node takes a lock from the SSD owner node and DMA data is received from the owner SSD to host (peer) system memory. Thus, hot read data builds up dynamically based on usage regardless of ownership, and is served from SSD with at most one transmission across the SAS link. No shipping from the underlying drives occurs for any hot read data stored in the SSD caches.

For a WRITE request for hot write data owned by the host node, the data moves only once over the SAS link to mirror the hot write data in the SSD cache on the peer node. For a WRITE request for hot write data owned by the peer node, the data moves once over the SAS link to mirror the hot write data in the SSD cache on the peer node. Hot write is therefore mirrored across the SSD cache on the servers and is served from SSD with a single transmission across the SAS link. Again, no shipping from the underlying drives occurs for any hot write data stored in the SSD caches. The dirty write data is eventually stored to the permanent storage on the correct owner drive once the data cools down (e.g., access to the data has slowed to below a threshold).

Referring now to the figures, FIG. 1 is a functional block diagram of a multi-server system 10 including a DAS cluster 30 configured to implement the smart active-active cache memory system of the present invention. The DAS cluster 30 includes, as illustrative examples, a host server 12a and a peer server 12b. The host server 12a includes a CPU complex 14a and a system memory 15a, typically DDR or DDR3 or other suitable SDRAM. The host server 12a also includes a DAS high available memory system, in this example mediated by a RAID controller 16a. In addition, the host server 12a includes a cache memory 18a, in this example a solid state device (SSD) such as flash memory. Similarly, the peer server 12b includes a CPU complex 14b, a system memory 15b, a RAID controller 16b, and a cache memory SSD 18b. It should be appreciated that although the cache memories 18a-b are shown as a solid state devices (SSDs) residing on their respective servers in these particular embodiments, the cache could be implemented through a dedicated attached drive, dedicated portion of an attached drive, or any other suitable computer memory allocated to the cache memory function of the present invention.

The DAS high available memory system relies on functional connections between the host and peer servers 12a-b and a first set of data drives 24a associated with the host server 12a and a second set of data drives 24b associated with the peer server 12b. Both servers 12a-b are connected to both sets of drives 24a-b for backup purposes in a server or drive failure mode but simultaneous access is restricted during normal operation to avoid multi-initiator issues. For example, the drives 24a-b may be operated in a dual-active configuration in which the host server 12a "owns" the first set of data drives 24a and the peer server 12b "owns" the second set of data drives 24b. In this case, I/O requests falling on the non-owning server must shipped to the owning server, which maintains exclusive control over its "owned" drives. Alternatively, the data drives 24a-b may be operated in an active-passive configuration in which only one set of data drives is active at a time. In both configurations, the DAS cluster 30 lacks true active-active access to both sets of data drives 24a-b simultaneously to avoid multi-initiator issues.

In this example configuration, the RAID controllers 16a-b mediate access to the underlying DAS data drives 24a-b and the cache memories 18a-b to implement the smart active-active cache memory system 32 of the present invention. While the servers (also referred to as controllers or nodes) may have different configurations from the illustrated embodiments, DAS controllers other than RAID controllers may control the cache memories, cache memories other than SSDs may be used, and there may be more than two nodes in the cluster, the basic elements shown in FIG. 1 are sufficient and provide a suitable working example of an environment in which the invention may be practiced. It will also be understood that system 30 may include a wide range of other components, and guest controllers may be allowed to access the DAS system. Only a minimal set of servers and components involved in implementing the invention are shown in the figures for convenience.

The active-active cache 32 provides the DAS cluster 30 with smart active-active access to "hot I/O" temporarily stored in the cache memories identified as SSDs 18a-b. The SSD 18a residing on the host server 12a provides a cache memory for "hot I/O", which includes "hot read" and "hot write" I/O. Similarly, the SSD 18b residing on the peer server 12b provides a cache memory for "hot I/O" including "hot read" and "hot write" I/O. The hot I/O data includes read and write data occurring frequently in the same local block address (LBA) range (i.e., frequently accessed I/O data). The frequency of access defining hot I/O data can be set as a design parameter based on the memory capacity of the SSDs 18a-b and other factors.

The cache memory should be sufficiently large compared to the expected I/O traffic to allow the great majority of I/O to occur from cache with dirty write cleared to permanent memory in the background or during low usage or idle periods. Hot read data can build up dynamically in each cache based on usage patterns regardless of the owner of the drives where the read data is permanently stored. The hot read data can be purged on an as-needed basis to maintain cache storage capacity, for example with read data accessed most remotely in time purged as needed to make room for new hot read data.

The hot write data may be referred to as "dirty write" data because it may include user changes to a copy of the same date in permanent memory. The hot write data is mirrored in the local cache on both servers to avoid potential conflicts in dirty write data.

FIG. 2 is a data flow diagram 40 for a read request for data stored on the owned node in the DAS cluster utilizing with active-active solid state cache system. The SSDs 18a-b each store hot read data based on dynamic usage pattern regardless of the ownership of the drives where the data is permanently stored. As a result, the SSD 18a stores hot read data requested through the server 12a regardless of which server owns the drives where the data is permanently stored. Similarly, the SSD 18b stores hot read data requested through the server 12b regardless of which server owns the drives where the data is permanently stored. As a result, a hot read I/O request received by the server 12a may fall on hot read data stored in either cache memory SSD 18a or SSD 18b. FIG. 2 illustrates the situation in which the server 12a receives a hot read I/O request falling on its own SSD 18a. In this case the hot read I/O request is treated as a DMA request served directly from the SSD 18a to the system memory 15a via the CacheCade 42a on the server 12a. Similarly, FIG. 2 illustrates the situation in which the server 12b receives a hot read I/O request falling on its own SSD 18b, in which the hot read I/O request is treated as a DMA request served directly from the SSD 18b to the system memory 15b via the CacheCade 42b on the server 12b.

Figure 3:
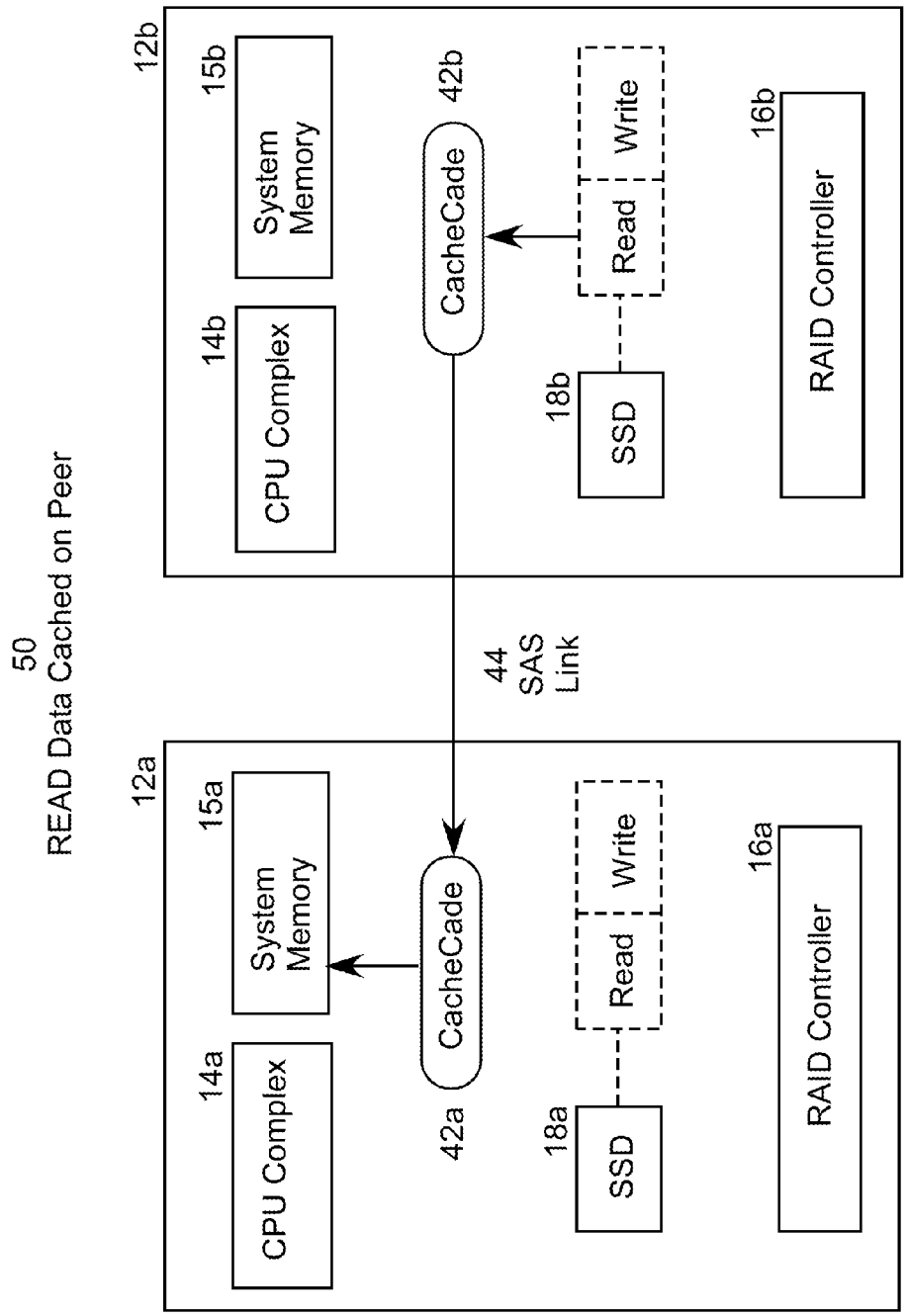
FIG. 3 is a data flow diagram of a read request for data stored on a peer node in the DAS cluster utilizing with active-active solid state cache system.

FIG. 3 is a data flow diagram 50 for the complimentary situation, in which a server receives a hot read I/O request for data stored on the peer SSD. In the example shows, the server 12a receives a hot read I/O request for data stored in the SSD 18b cache memory on the peer server 12b. In this case, the requested I/O is treated as a DMA request served directly from the SSD 18b to the peer CacheCade 42b. The requested data is then transported via the SAS link 44 to the host CacheCade 42a and on to the system memory 15a. As a result, the I/O request appears like a conventional DMA request to the to the host server, and the requested hot read I/O is shipped between the CacheCade modules 42a-b without requiring additional overhead data shipping control by either of the servers 18a-b. This replaces the conventional disk data read and CPU mediated data shipping process with the cache data read and RAID mediated SAS link transport active-active data access procedure of the present invention.

Figure 4:
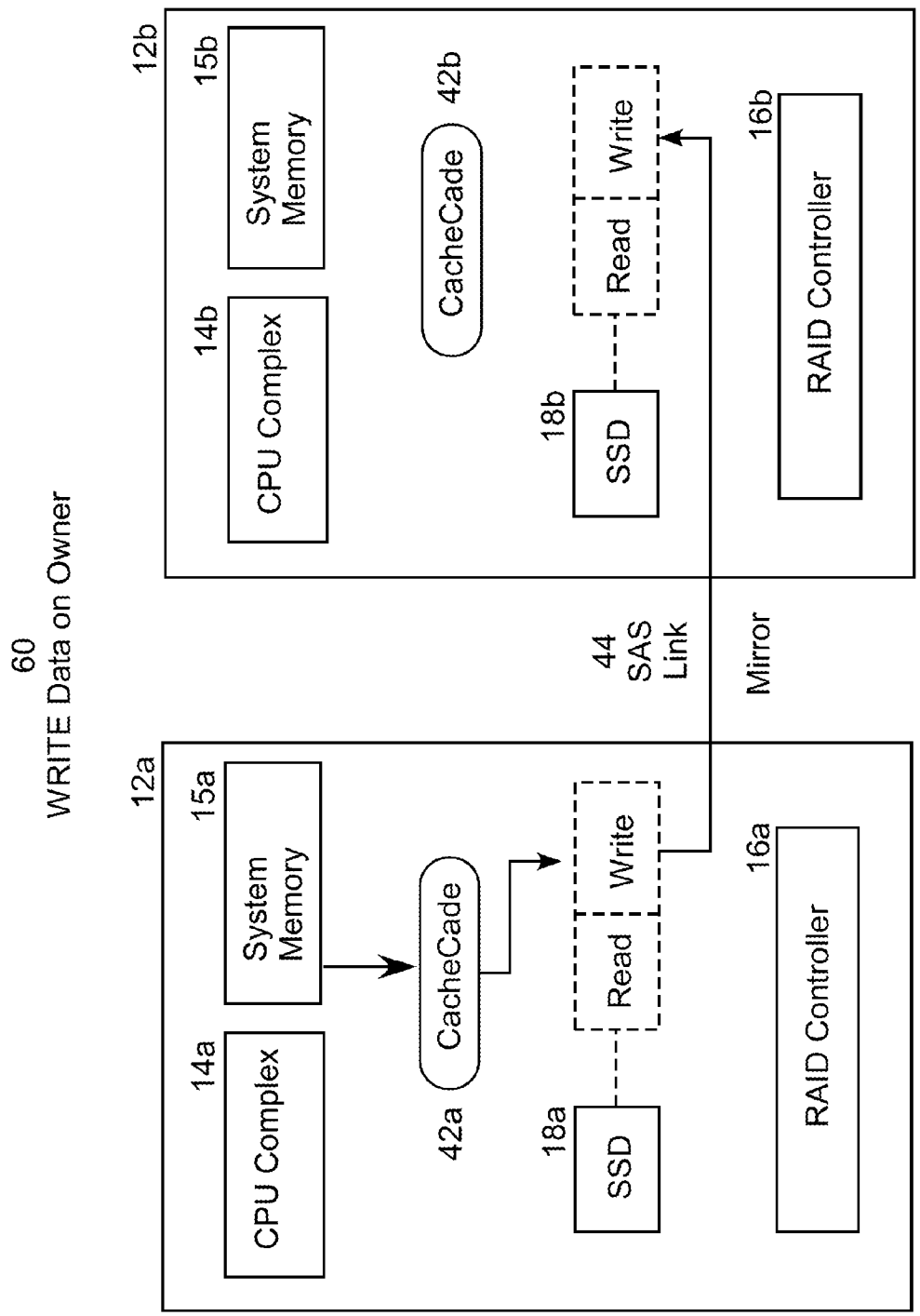
FIG. 4 is a data flow diagram of a write request for data stored on the owned node in the DAS cluster utilizing with active-active solid state cache system.

FIG. 4 is a data flow diagram 60 for a write request for data stored on the owned node in the DAS cluster. In the example shown, the host server 12a receives a write request for data permanently stored on the host server. The write data is written to the hot write data section of the SSD 18a and transported across the SAS link 44 to the peer server 12b, where it is mirrored in the hot write data section of the SSD 18b. This ensures that the any dirty write data is mirrored in both cache memories 18a-b to avoid any potential dirty write data conflicts.

Figure 5:
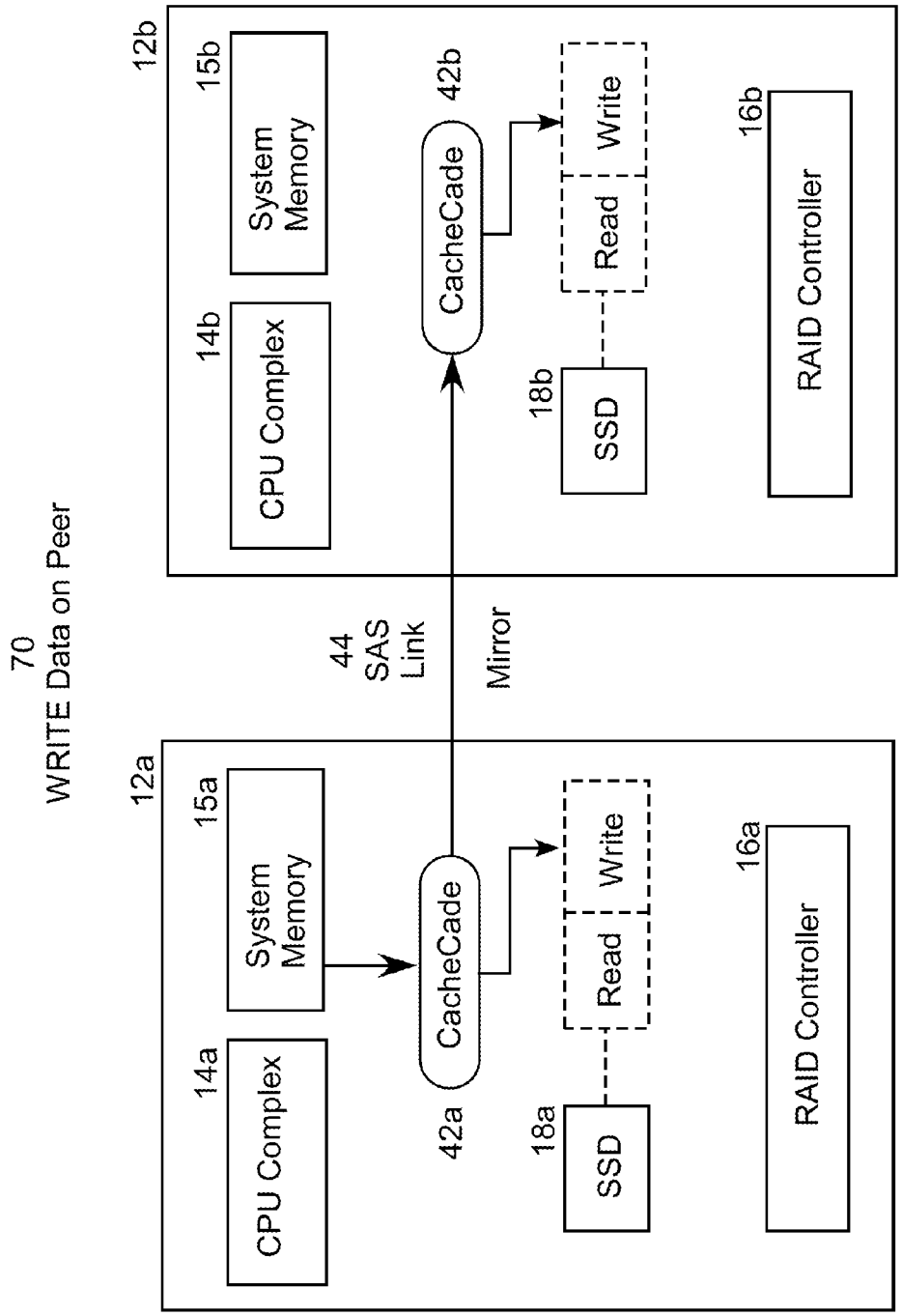
FIG. 5 is a data flow diagram of a write request for data stored on a peer node in the DAS cluster utilizing with active-active solid state cache system.

FIG. 5 is a data flow diagram 70 for the complimentary situation, in which a server receives a hot write I/O request for data permanently stored on a drive owned by the peer server. In the example shows, the server 12a receives a hot write I/O request for data permanently stored in a drive owned by the peer server 12b. The write data is initially stored in the host SSD 18a. The write data is them transmitted from the Cache-Cade 42a on the host server 12a via the SAS link 44 to the CacheCade 42b on the peer server 12b. The hot write data is then written to the hot write data section of the peer SSD 18b to mirror the hot write data in both cache memories 18a-b to avoid any potential dirty write data conflicts.

Figure 6:
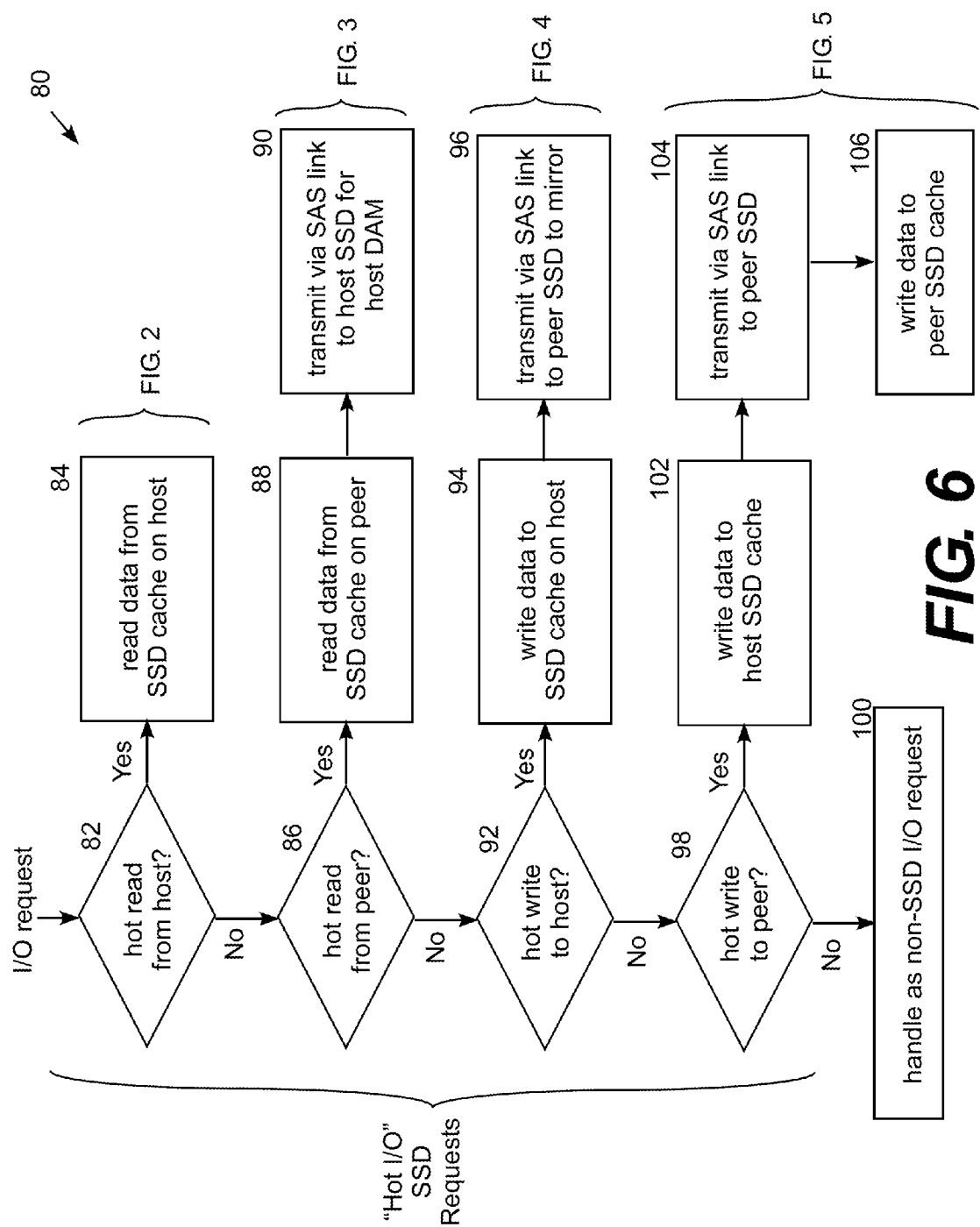
FIG. 6 is a logic flow diagram for operating the active-active cache memory system.

FIG. 6 is a logic flow diagram 80 for operating the active-active cache memory system. In step 82, the system determines whether a hot read I/O request received on a host server falls on the solid state cache memory of the host server. If a hot read I/O request has been received on the host server falling on the solid state cache memory of the host server, the "YES" branch is followed from step 82 to step 84, in which the I/O request is read directly from the solid state cache memory on the host server. This situation corresponds to the data flow diagram of FIG. 2.

If a hot read I/O request has not been received on the host server falling on the solid state cache memory of the host server, the "NO" branch is followed from step 82 to step 86, in which the system determines whether a hot read I/O request received on a host server falls on the solid state cache memory of a peer server. If a hot read I/O request has been received on the host server falling on the solid state cache memory of the peer server, the "YES" branch is followed from step 86 to step 88, in which the I/O request is read directly from the solid state cache memory on the peer server. Step 88 is followed by step 90, in which the hot read data is transported via the SAS link to the solid state cache memory of the host server, where the host server accesses the data from the host solid state cache through direct memory access. This situation corresponds to the data flow diagram of FIG. 3.

If a hot read I/O request has not been received on the host server falling on the solid state cache memory of the peer server, the "NO" branch is followed from step 86 to step 92, in which the system determines whether a hot write I/O request has been received on a host server that falls on permanent memory owned by the host server. If a hot write I/O request has been received on a host server that falls on permanent memory owned by the host server, the "YES" branch is followed from step 92 to step 94, in which the write data is written to the solid state cache memory on the host server. Step 84 is followed by step 99, in which the hot write data is transported via the SAS link to the solid state cache memory of the peer server to mirror the write data across the servers to prevent potential conflicts in dirty write data stored on different servers. This situation corresponds to the data flow diagram of FIG. 4.

If a hot write I/O request has not been received on the host server that falls on permanent memory owned by the host server, the "NO" branch is followed from step 92 to step 98, in which the system determines whether a hot write I/O request has been received on a host server that falls on permanent memory owned by a peer server. If a hot write I/O request has been received on a host server that falls on permanent memory owned by a peer server, the "YES" branch is followed from step 98 to step 102, in which the write data is stored in the cache memory on the host server. Step 102 is followed by step 104, in which the hot write data is transported via the SAS link to the solid state cache memory of the peer server. Step 104 is followed by step 106, in which the hot write data is stored in the cache memory of the peer server to mirror the write data across the servers to prevent potential conflicts in dirty write data stored on different servers. This situation corresponds to the data flow diagram of FIG. 5.

Figure 7:
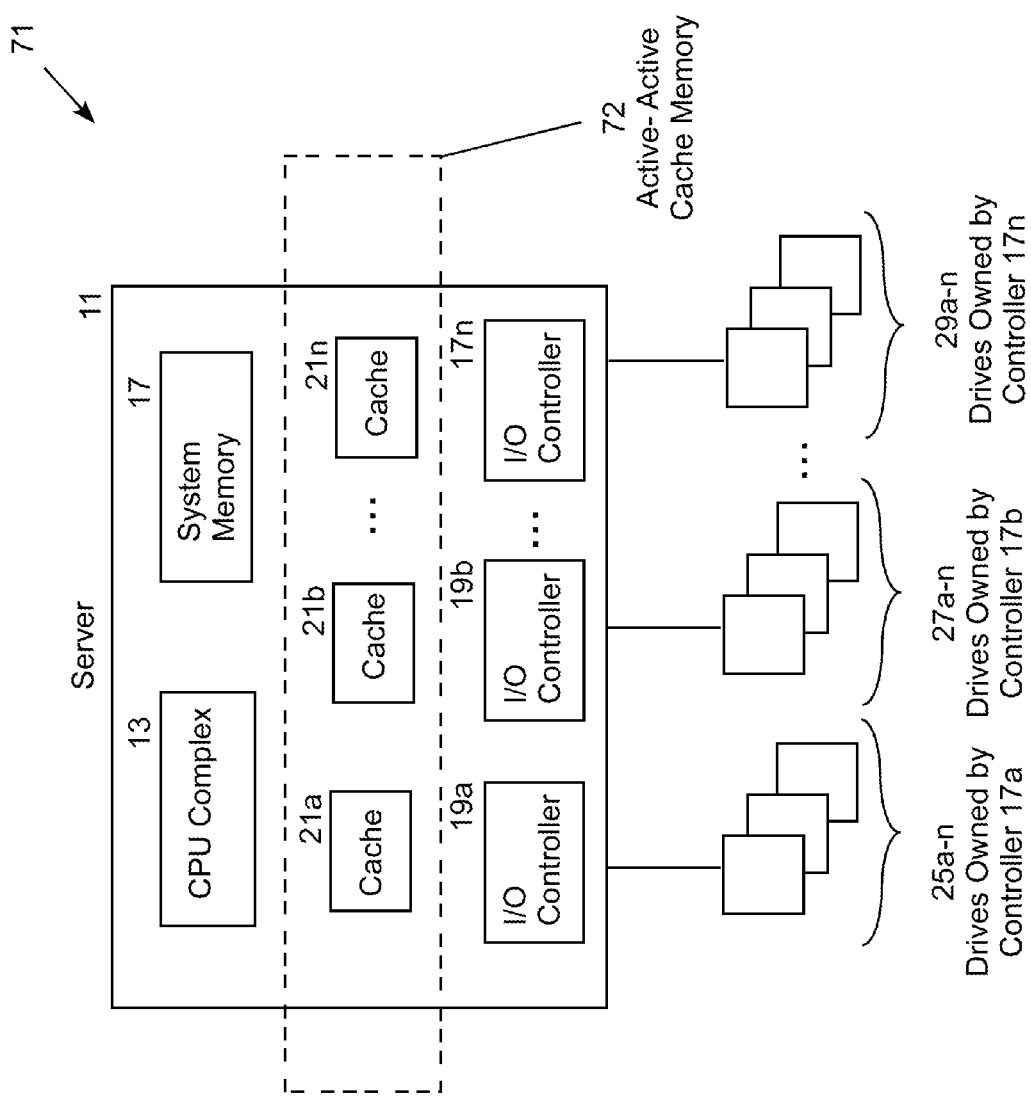
FIG. 7 is a functional block diagram of a server with multiple I/O controllers forming a DAS cluster with active-active solid state cache.

FIG. 7 is a functional block diagram of an alternative DAS system 71 in which a single server contains multiple I/O controllers configured to implement the smart active-active cache memory system of the present invention. The DAS system 71 of FIG. 7 is similar to the DAS system 30 of FIG. 1, except that multiple controllers implemented on a single server have taken the place of multiple controllers implemented on different servers. Otherwise, the DAS of FIG. 7 operates in an analogous manner to the DAS of FIG. 1. It will be appreciated that this system includes a separate cache memory dedicated to each I/O controller, which in turn mediates access to its dedicated set of data drives. The cache memories are configured to implement the smart active-active cache memory system of the present invention, in which hot read data accumulates dynamically in each cache regardless of ownership and dirty write data is mirrored across the cache memories. The single-server, multiple-controller DAS system is similar to the multiple-server DAS system except that multiple controllers implemented on a single server take the place of multiple controllers implemented on different servers. The DAS system otherwise operate in an analogous manner. In this manner, the invention may be practiced among any set of I/O controllers with dedicated drives regardless of the number of I/O controllers implemented on any particular server.

More specifically, the DAS high available memory 71 includes a server 11 having a CPU complex 13 and a system memory 17, typically DDR or DDR3 or other suitable SDRAM. The DAS high available memory system 71 in this example is mediated by a plurality of RAID controller 19a-n. The host server 11 includes an active-active cache memory system 72 including a plurality a cache memories 21a, for example a solid state device (SSD) such as flash memory. Each cache memory is dedicated to an associated I/O controller, cache 21a is dedicated to I/O controller 19a, cache 21b is dedicated to I/O controller 19b, and so forth. In addition, each I/O controller "owns" an associated set of dedicated data drives, I/O controller 19a owns drives 25a-n, I/O controller 19b owns drives 27a-n, and so forth.

The DAS system 71 relies on functional connections between the server 11 and the sets of data drives 25a-n, 27a-n, etc. The server is connected to all sets of drives for backup purposes in a server or drive failure mode but simultaneous access is restricted and mediated by the controllers during normal operation to avoid multi-initiator issues. For example, the drives 25a-n owned by the controller 19a can only be accessed through the controller 19a, the drives 27a-n owned by the controller 19b can only be accessed through the controller 19b, and so forth. Each set of drives may be operated in a dual-active or active-passive configuration, as desired. For example, the drives 25a-n owned by the controller 19a may be operated in an active-passive mode, and the drives 27a-n owned by the controller 19b may be operated in an active-passive mode. More generally, any combination of drive control modes may be used in any of the I/O controllers, as desired.

To implement the smart active-active cache memory system, the cache memory 21a is dedicated to the I/O controller 19a, which owns the drives 25a-n; the cache memory 21b is dedicated to the I/O controller 19b, which owns the drives 27a-n; and so forth. Once each set of drives has a dedicated I/O controller and cache memory, the cache memory system is operated in the same manner described previously with reference to the DAS System 30 shown in FIG. 1, in which that the I/O controllers 19a-b in the single server of the DAS 71 (FIG. 7) take the place of the I/O controllers 16a-b in the dual-server DAS system 30 (FIG. 1). Data transportation across the SAS is also eliminated for the single server, multi-controller configuration. Each DAS system 30 and 71 may be expanded to include a larger number of "n" I/O controllers, as desired. In addition, multi-controller servers may be combined with single-controller servers, provided that each controller has its own dedicated set of drives and cache memory. That is, the invention may be practiced among any set of I/O controllers with dedicated drives regardless of the number of I/O controllers implemented on any particular server.

The present invention may consist (but not required to consist) of adapting or reconfiguring presently existing systems. Alternatively, original equipment may be provided embodying the invention.

All of the methods described herein may include storing results of one or more steps of the method embodiments in a storage medium. The results may include any of the results described herein and may be stored in any manner known in the art. The storage medium may include any storage medium described herein or any other suitable storage medium known in the art. After the results have been stored, the results can be accessed in the storage medium and used by any of the method or system embodiments described herein, formatted for display to a user, used by another software module, method, or system, etc. Furthermore, the results may be stored "permanently," "semi-permanently," temporarily, or for some period of time. For example, the storage medium may be random access memory (RAM), and the results may not necessarily persist indefinitely in the storage medium.

It is further contemplated that each of the embodiments of the method described above may include any other step(s) of any other method(s) described herein. In addition, each of the embodiments of the method described above may be performed by any of the systems described herein.

Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected", or "coupled", to each other to achieve the desired functionality, and any two components capable of being so associated can also be viewed as being "couplable", to each other to achieve the desired functionality. Specific examples of couplable include but are not limited to physically mateable and/or physically interacting components and/or wirelessly interactable and/or wirelessly interacting components and/or logically interacting and/or logically interactable components.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein.

Furthermore, it is to be understood that the invention is defined by the appended claims.

Although particular embodiments of this invention have been illustrated, it is apparent that various modifications and embodiments of the invention may be made by those skilled in the art without departing from the scope and spirit of the foregoing disclosure. Accordingly, the scope of the invention should be limited only by the claims appended hereto.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

The invention claimed is:

1. A multi-controller-server computer system comprising a host server, a peer server, and a high availability direct attached storage system comprising:
   a first set of directly attached data drives owned by the host server;
   a second set of directly attached data drives owned by the peer server;
   a cache memory system comprising a host cache memory residing on or attached to the host server and a peer cache memory residing on or attached to the peer server;
   wherein the cache memory system provides active-active access to hot I/O data stored in the cache memory system while avoiding multi-initiator conflicts between the first and second sets of directly attached data drives relating to the hot I/O data;
   wherein the host cache memory is configured to store hot read data resulting from dynamic system usage, based on usage patterns, regardless of ownership of the attached data drives where the hot read data is permanently stored;
   wherein the peer cache memory is configured to store hot read data resulting from dynamic system usage, based on usage patterns, regardless of ownership of the attached data drives where the hot read data is permanently stored;
   wherein the hot read data is purged to maintain cache storage capacity; and
   wherein the host and peer cache memories are further configured to store hot write data mirrored across the host and peer cache memories to prevent data conflicts from arising in dirty write data stored in the host and peer cache memories and to provide uncommitted data availability in case of server or controller failure.

2. The multi-server computer system of claim 1, wherein the first and second sets of directly attached data drives comprise a dual-active configuration.

3. The multi-server computer system of claim 1, wherein the first and second sets of directly attached data drives comprise an active-passive configuration.

4. The multi-server computer system of claim 1, wherein multiple servers act in a combination of active-passive and dual-active modes.

5. The multi-server computer system of claim 1, further comprising a first RAID controller residing on the host server and a second RAID controller residing on the peer server, wherein the RAID controllers mediate server access to the high availability direct attached storage system.

6. The multi-server computer system of claim 1, wherein a hot I/O read request received by the host server falling on hot read I/O data stored in the cache memory residing on the host server is provided to system memory of the host server via direct memory access to the cache memory residing on the host server.

7. The multi-server computer system of claim 1, wherein a hot I/O read request received by the host server falling on hot read I/O data stored in the cache memory residing on the peer server is provided to system memory of the host server via direct memory access to the cache memory residing on the peer server.

8. The multi-server computer system of claim 1, wherein a hot I/O write request received by the host server falling on the direct access data drives owned by the host server is stored in the cache memory residing on the host server and mirrored in the cache memory residing on the peer server to avoid potential data conflicts in dirty write data stored in the host and peer solid state cache memories.

9. The multi-server computer system of claim 8, wherein caching of the hot I/O write received by the host server falling on the direct access data drives owned by the host server includes a single transport of the hot write data across a SAS link between the host and peer servers.

10. The multi-server computer system of claim 1, wherein a hot I/O write request received by the host server falling on the direct access data drives owned by the peer server is stored in the cache memory residing on the host server and mirrored in the cache memory residing on the peer server to avoid potential data conflicts in dirty write data stored in the host and peer solid state cache memories.

11. The multi-server computer system of claim 10, wherein caching of the hot I/O write data received by the host server falling on the direct access data drives owned by the peer server includes a single of the hot write data across a SAS link between the host and peer servers.

12. The multi-server computer system of claim 1, wherein the host cache memory comprises a solid state cache memory residing on the host server.

13. The multi-server computer system of claim 12, wherein the peer cache memory comprises a solid state cache memory residing on the peer server.

14. A method for providing a multi-server computer system comprising a host server, a peer server, and a high availability direct attached storage system, comprising the steps of:
   providing a first set of directly attached data drives owned by the host server;
   providing a second set of directly attached data drives owned by the peer server;
   providing a cache memory system comprising a host cache memory residing on the host server and a peer cache memory residing on the peer server;
   wherein the cache memory system provides active-active access to hot I/O data stored in the cache memory system while avoiding multi-initiator conflicts between the first and second sets of directly attached data drives relating to the hot I/O data;
   wherein the host cache memory is configured to store hot read data resulting from dynamic system usage, based on usage patterns, regardless of ownership of the attached data drives where the hot read data is permanently stored;
   wherein the peer cache memory is configured to store hot read data resulting from dynamic system usage, based on usage patterns, regardless of ownership of the attached data drives where the hot read data is permanently stored;
   wherein the hot read data is purged to maintain cache storage capacity; and
   wherein the host and peer solid state cache memories are further configured to store hot write data mirrored across the host and peer solid state cache memories to prevent data conflicts from arising in dirty write data stored in the host and peer solid state cache memories.

15. The method of claim 14, further comprising the step of configuring the first and second sets of directly attached data drives in a dual-active configuration.

16. The method of claim 14, further comprising the step of configuring the first and second sets of directly attached data drives in an active-passive configuration.

17. The method of claim 14, further comprising the step of providing a first RAID controller residing on the host server and a second RAID controller residing on the peer server, wherein the RAID controllers mediate server access to the high availability direct attached storage system.

18. The method of claim 14, further comprising the steps of receiving a hot I/O read request on the host server falling on hot read I/O data stored in the cache memory residing on the host server and providing the requested data to system memory of the host server via direct memory access to the cache memory residing on the host server.

19. The method of claim 14, further comprising the steps of receiving a hot I/O read request on the host server falling on hot read I/O data stored in the cache memory residing on the peer server and providing the requested data to system memory of the host server via direct memory access to the cache memory residing on the peer server.

20. The method of claim 14, further comprising the steps of receiving a hot I/O write request on the host server falling on the direct access data drives owned by the host server, storing the hot write data in the cache memory residing on the host server, and mirroring the hot write data in the cache memory residing on the peer server to avoid potential data conflicts in dirty write data stored in the host and peer solid state cache memories.

21. The method of claim 20, wherein caching of the hot I/O write received by the host server falling on the direct access data drives owned by the host server includes a single transport of the hot write data across a SAS link between the host and peer servers.

22. The method of claim 14, further comprising the steps of receiving a hot I/O write request on the host server falling on the direct access data drives owned by the peer server, storing the hot read data in the cache memory residing on the peer server, and mirroring the hot write data in the cache memory residing on the host server to avoid potential data conflicts in dirty write data stored in the host and peer solid state cache memories.

23. The method of claim 22, wherein caching of the hot I/O write data received by the host server falling on the direct access data drives owned by the peer server includes a single transport of the hot write data across a SAS link between the host and peer servers.

24. A multi-controller computer system comprising a server, first and second I/O controllers operating on the server, and a high availability direct attached storage system comprising:
   a first set of directly attached data drives owned by the first I/O controller;
   a second set of directly attached data drives owned by the second I/O controller;
   a cache memory system residing on the server comprising a first cache memory dedicated to the first I/O controller and a second cache memory dedicated to the second I/O controller;
   wherein the cache memory system provides active-active access to hot I/O data stored in the first and second cache memories while avoiding multi-initiator conflicts between the first and second sets of directly attached data drives relating to the hot I/O data;
   wherein the first cache memory is configured to store hot read data resulting from dynamic system usage regardless of ownership of the attached data drives where the hot read data is permanently stored;
   wherein the second cache memory is configured to store hot read data resulting from dynamic system usage regardless of ownership of the attached data drives where the hot read data is permanently stored;
   wherein the hot read data is purged to maintain cache storage capacity; and
   wherein the host and peer cache memories are further configured to store hot write data mirrored across the first and second cache memories to prevent data conflicts from arising in dirty write data stored in the first and second cache memories and to provide uncommitted data availability in case of server or controller failure.

* * * * *